US011161229B2

(12) United States Patent
Yamamoto et al.

(10) Patent No.: US 11,161,229 B2
(45) Date of Patent: Nov. 2, 2021

(54) CLAMPING JIG FOR TUBE CONNECTION

(71) Applicants: YODOGAWA HU-TECH CO., LTD., Suita (JP); CKD CORPORATION, Aichi (JP)

(72) Inventors: Akihiro Yamamoto, Suita (JP); Naoyuki Oba, Suita (JP); Katsumi Ogawa, Suita (JP); Hiroki Iwata, Aichi (JP)

(73) Assignees: YODOGAWA HU-TECH CO., LTD., Osaka (JP); CKD CORPORATION, Aichi (JP)

( * ) Notice: Subject to any disclaimer, the term of this patent is extended or adjusted under 35 U.S.C. 154(b) by 470 days.

(21) Appl. No.: 16/286,959

(22) Filed: Feb. 27, 2019

(65) Prior Publication Data
US 2019/0321951 A1 Oct. 24, 2019

(51) Int. Cl.
*B25B 5/00* (2006.01)
*B25B 27/10* (2006.01)
(Continued)

(52) U.S. Cl.
CPC ............... *B25B 27/10* (2013.01); *B25B 5/04* (2013.01); *B25B 5/08* (2013.01); *B25B 5/12* (2013.01);
(Continued)

(58) Field of Classification Search
CPC ........... B25B 27/00; B25B 27/10; B25B 5/04; B25B 5/08; B25B 5/163; F16L 23/036
See application file for complete search history.

(56) References Cited

U.S. PATENT DOCUMENTS

| 3,845,538 A | 11/1974 | Demler, Sr. |
| 8,621,736 B1 * | 1/2014 | Hall ............................... 29/271 |

(Continued)

FOREIGN PATENT DOCUMENTS

| JP | SHO50-32526 | 6/1974 |
| JP | HEI05-272663 A | 10/1993 |
| JP | 2009-103303 A | 5/2009 |

OTHER PUBLICATIONS

Japanese Patent Office, "Office Action" from counterpart JP Application No. 2018-080404 (No English language translation available), 5 pages, dated Nov. 19, 2019.

*Primary Examiner* — Lee D Wilson
(74) *Attorney, Agent, or Firm* — Eckert Seamans Cherin & Mellott, LLC

(57) ABSTRACT

The present invention provides a clamping jig for tube connection with which it is possible to clamp tubes even in a small and narrow space. A clamping jig for tube connection 10 according to the present invention is a clamping jig for tube connection that clamps joint-equipped tubes 60, each tube including a protruding collar portion 63 at a position rearward of its leading end. The clamping jig for tube connection includes: a first member 20 that includes a first clamping portion 21 that is provided at a leading end thereof and to which one of the tubes is fitted, and a first gripping portion 23 formed at a base end thereof, a second member 30 that includes a second clamping portion 31 that is provided at a leading end thereof and to which the other tube is fitted, and a base end thereof being pivotally supported at the base end of the first member by a pivoting portion 27; a support rod 25 that extends from the first member through the second member; and a lever member 40 in which a leading end thereof is pivotally supported by a support portion 26 provided in the support rod, and a lever gripping portion 41 is formed at a base end thereof, the lever (Continued)

member 40 enabling swinging of the lever gripping portion in a direction of the base end of the second member, and the lever member 40 including a pressing portion 42 that presses the second member on the base end side relative to the support portion.

6 Claims, 4 Drawing Sheets

(51) Int. Cl.
    *F16L 23/036*     (2006.01)
    *B25B 5/04*     (2006.01)
    *B25B 5/16*     (2006.01)
    *B29C 65/78*     (2006.01)
    *B25B 5/12*     (2006.01)
    *B25B 27/16*     (2006.01)
    *B25B 5/08*     (2006.01)
(52) U.S. Cl.
    CPC .............. *B25B 5/163* (2013.01); *B25B 27/16* (2013.01); *B29C 65/7841* (2013.01); *F16L 23/036* (2013.01)

(56) References Cited

U.S. PATENT DOCUMENTS

| | | | | |
|---|---|---|---|---|
| 9,339,939 | B1* | 5/2016 | Haney | B25B 7/08 |
| 2019/0321951 | A1* | 10/2019 | Yamamoto | B25B 5/12 |
| 2021/0146505 | A1* | 5/2021 | Buchanan | B25B 7/123 |

* cited by examiner

CLAMPING JIG FOR TUBE CONNECTION

BACKGROUND OF THE INVENTION

Field of the Invention

The present invention relates to a clamping jig that is used to connect tubes through which a fluid flows.

Description of Related Art

In various types of apparatuses, such as production apparatuses, cleaning apparatuses, and assembling apparatuses, used in the field of electronics such as semiconductors, the pharmaceutical field, the biotechnology field, and other fields, tubes made of fluorinated resin are used to supply and transfer a raw material fluid, a cleaning fluid, a fuel fluid, or the like.

As the tubes, joint-equipped tubes that have joints at their leading ends have been proposed. The leading ends of the joint-equipped tubes are connected via an annular sealing member, and are kept in a connected state by a clip that sandwiches the joints from the outer circumferential surface thereof (see, for example, Patent Document 1).

Each joint includes an annular collar portion on the rear side thereof. When connecting tubes, the collar portions are directed toward the sealing member, and clamped and pressed using a clamping jig, and as a result the tubes are firmly attached to the sealing member.

Patent Document 1 proposes a scissor-like jig used as a clamping jig. The jig includes: gripping portions provided at the base ends of two rod members that are cross-supported; and clamping portions with a U-shaped clamping groove provided at the leading ends of the rod members. The clamping jig is used as follows: tubes are inserted into the clamping grooves from the rear side of the collar portions of the tubes, the gripping portions are squeezed together to cause the clamping portions to press the collar portions to provide a clamping force, and the tubes are firmly attached to the sealing member and connected to each other.

PRIOR ART DOCUMENTS

Patent Documents

Patent Document 1: Japanese Patent Publication No. 2009-103303A

SUMMARY OF THE INVENTION

With the clamping jig, to open the clamping portions, the gripping portions need to be symmetrically opened about the cross-supported portion. However, in the case where sufficient workspace cannot be secured, or the tubes are positioned near another tube, a device, a wall surface, or the like, it may not be possible to open the gripping portions, or the user may not be able to place his/her fingers to hold the gripping portions and apply a sufficient gripping force.

Furthermore, the clamping jig has a configuration in which the gripping portions that serve as the effort point are provided on the base end side, and the clamping portions that serve as the load point are provided on the leading end side, with the cross-supported portion serving as the fulcrum point. Accordingly, in order to provide a large clamping force with a small gripping force, it is necessary to have a long distance between the effort point and the fulcrum point and a short distance between the fulcrum point and the load point. However, increasing the distance between the effort point and the fulcrum point results in an increase in the size of the clamping jig. On the other hand, reducing the distance between the load point and the fulcrum point so as to make the clamping jig compact requires that the gripping portions are opened over a large range in order to open the clamping portions. Also, a large workspace is required, and the ease of operation decreases.

It is an object of the present invention to provide a clamping jig for tube connection, with which it is possible to clamp tubes even in a small and narrow space. It is another object of the present invention to provide a clamping jig for tube connection that can provide a large clamping force while being compact.

A clamping jig for tube connection according to the present invention is a clamping jig for tube connection that clamps joint-equipped tubes, each tube including a protruding collar portion, at a position at a rear of its leading end, the clamping jig for tube connection including:

a first member that includes a first clamping portion that is provided at a leading end thereof and to which one of the tubes is fitted, and a first gripping portion formed at a base end thereof;

a second member that includes a second clamping portion that is provided at a leading end thereof and to which the other tube is fitted, and a base end thereof being pivotally supported at the base end of the first member by a pivoting portion;

a support rod that extends from the first member through the second member; and a lever member in which a leading end thereof is pivotally supported by a support portion provided in the support rod, and a lever gripping portion is formed at a base end thereof, the lever member enabling swinging of the lever gripping portion in a direction of the base end of the second member, and the lever member including a pressing portion that presses the second member on the base end side relative to the support portion.

It is desirable that, in the first member, the first gripping portion is provided at a position recessed from the first clamping portion.

The clamping jig may include a biasing member that is provided between the first member and the second member and biases the second member in a direction away from the first member.

The pressing portion may be a pressing roller that is pivotally supported on the lever member.

It is desirable that the pressing portion is configured to press the second member between the support portion and the pivoting portion.

The first clamping portion and the second clamping portion may be U-shaped clamping grooves.

With the clamping jig for tube connection according to the present invention, the pivoting portion that serves as the fulcrum point is provided on the base end side and the clamping portions that serve as the load point are provided on the leading end side, and thus the distance between the fulcrum point and the load point can be increased. Accordingly, it is possible to suppress relative variation of the angle between the first member and the second member when opening the clamping portions.

Also, the pressing portion that serves as the effort point on the second member is provided between the pivoting portion that serves as the fulcrum point and the clamping portions that serve as the load point, and thus the clamping jig can be made compact. Furthermore, by providing the pressing portion at a position toward the clamping portions, the distance between the effort point and the fulcrum point can be increased, and it is therefore possible to provide a large clamping force.

With respect to the first member, the first gripping portion is provided at a position recessed from the first clamping portion. Accordingly, even in the case where the distance to another tube, a device, a wall surface, or the like is short, the user can easily place his/her fingers on the first gripping portion, and thus the workability can be improved.

DETAILED DESCRIPTION OF THE INVENTION

Hereinafter, a clamping jig for tube connection 10 according to an embodiment of the present invention will be described with reference to the drawings. For the sake of understanding the description, in FIG. 1, the right side will be referred to as "base end", and the left side will be referred to as "leading end". Also, the upper side will be referred to as "up", and the lower side will be referred to as "down".

Figure 1:
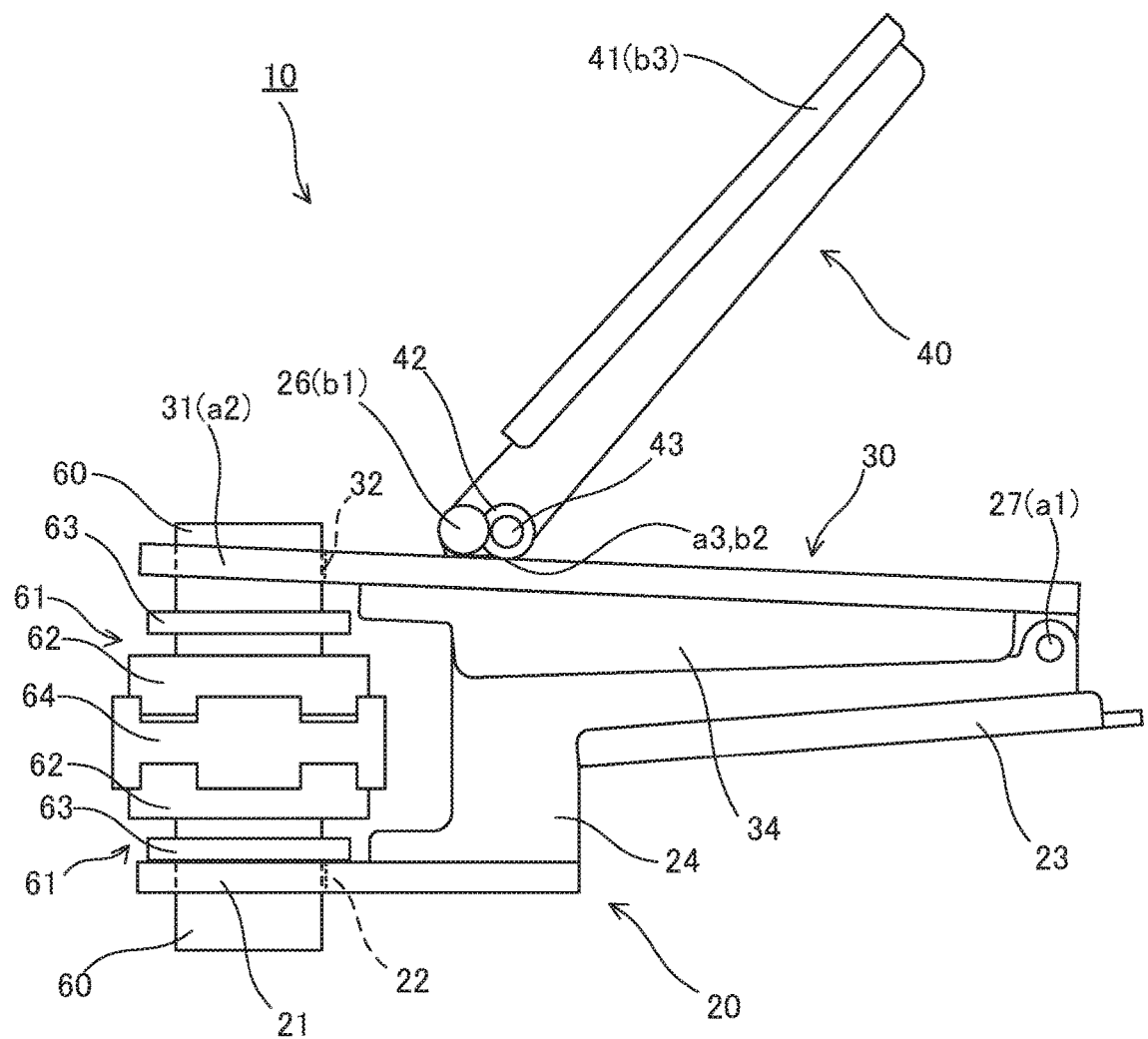
FIG. 1 is a side view showing a process of connecting tubes using a clamping jig for tube connection according to an embodiment of the present invention.
Figure 2:
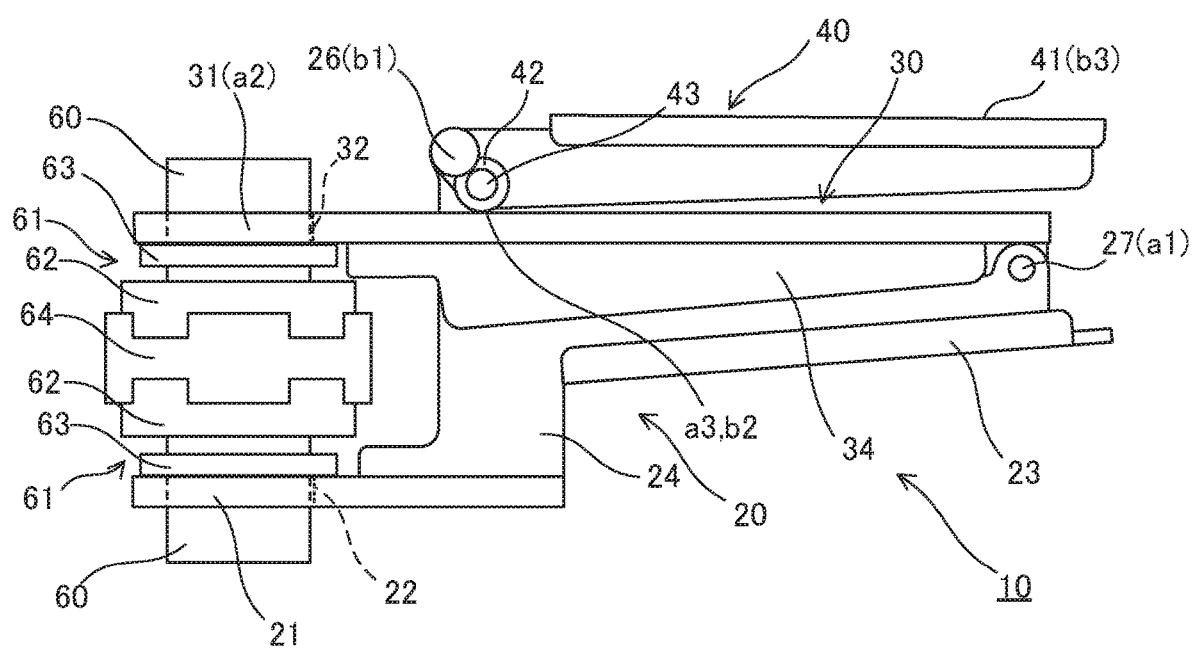
FIG. 2 is a side view showing a state in which the tubes are connected as a result of collar portions being pressed by the clamping jig.
Figure 3:
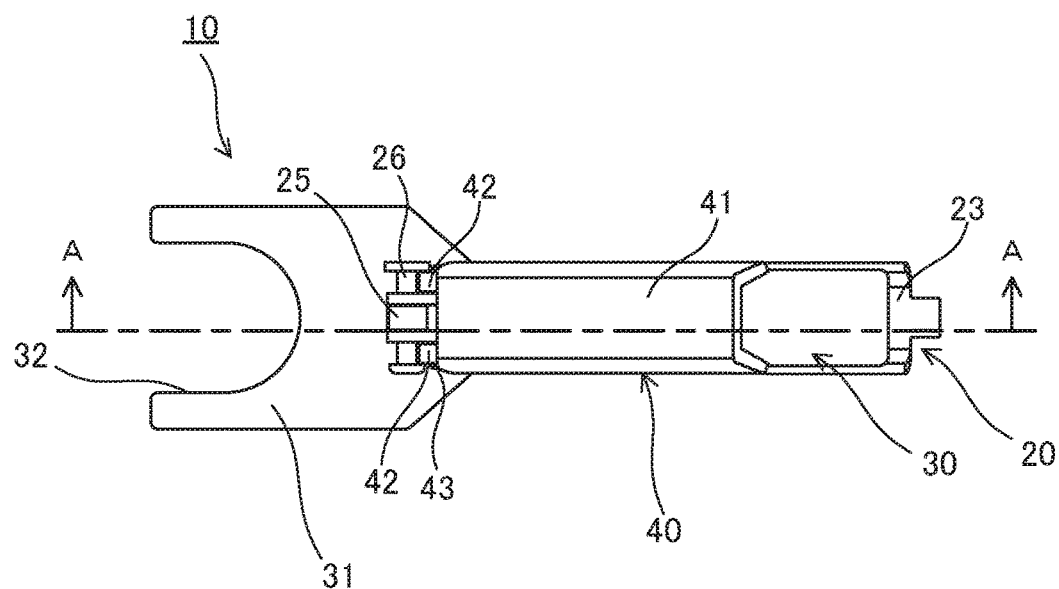
FIG. 3 is a plan view of the clamping jig.
Figure 4:
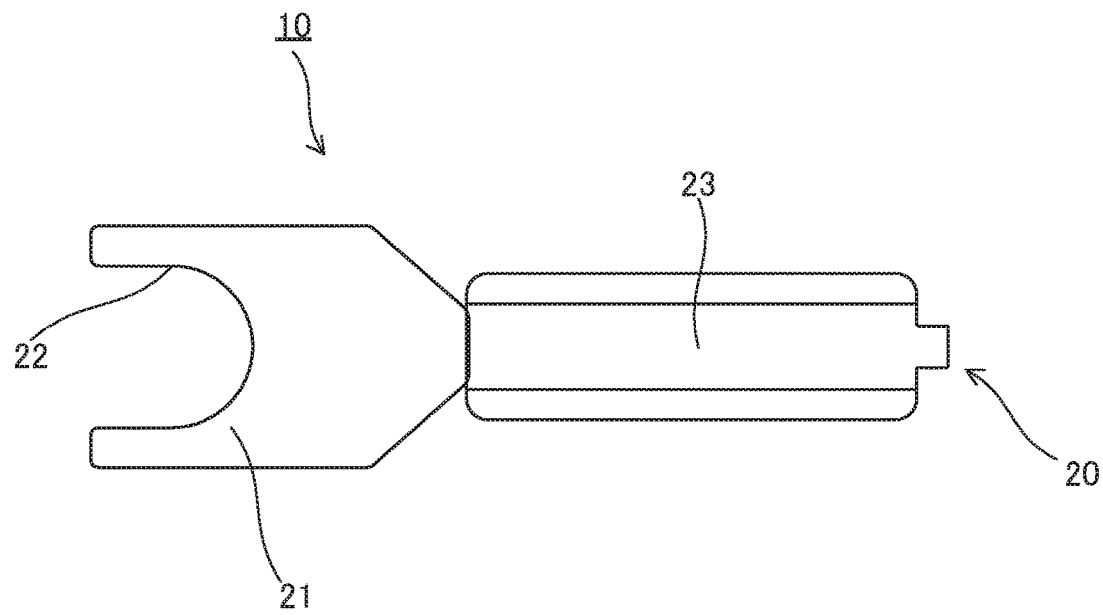
FIG. 4 is a bottom view of the clamping jig.

As shown in FIGS. 1 and 2, the clamping jig for tube connection 10 according to the present invention is a jig used to connect joint-equipped tubes 60 and 60. As shown in the diagrams, each tube 60 includes a joint 61 that includes a flange 62 at its leading end and a protruding annular collar portion 63 at a position behind the flange 62. The tubes 60 and 60 are connected by placing the tubes 60 and 60 facing each other with an annular sealing member 64 interposed between the flanges 62 and 62, and pressing the tubes 60 and 60 using the clamping jig 10 so as to bring the collar portions 63 and 63 closer to each other, and thereby firmly attaching the flanges 62 and 62 to the sealing member 64. Where necessary, an annular clip may be attached to the connecting portion. The tubes 60 are not limited to straight tubes, and may be branch tubes, or tubes equipped with a valve or a flow meter, or tubes extending from various types of fluidic devices.

The tubes 60 and the joints 61 may be made of a hot-melt material, such as a fluorinated resin material, that has excellent corrosion resistance, in the cases where they are to be used in various types of apparatuses such as production apparatuses, cleaning apparatuses, and assembling apparatuses in the field of electronics such as semiconductors, the pharmaceutical field, the biotechnology field, and other fields. It is preferable to use a tetrafluoroethylene-perfluoroalkylvinylether copolymer (PFA) as the fluorinated resin material. Other examples include a tetrafluoroethylene-hexafluoropropylene copolymer (FEP), a tetrafluoroethylene-hexafluoropropylene-vinylidene fluoride ternary copolymer, and the like. However, the material and the properties of the tubes 60 and the joints 61 are not limited thereto.

As shown in FIGS. 1 to 5, the clamping jig 10 includes, as the main components, a first member 20, a second member 30, and a lever member 40. The first member 20, the second member 30, and the lever member 40 have predetermined strength and rigidity, and are preferably made of stainless steel so as to prevent the tubes 60 from rusting or the like.

Figure 5:
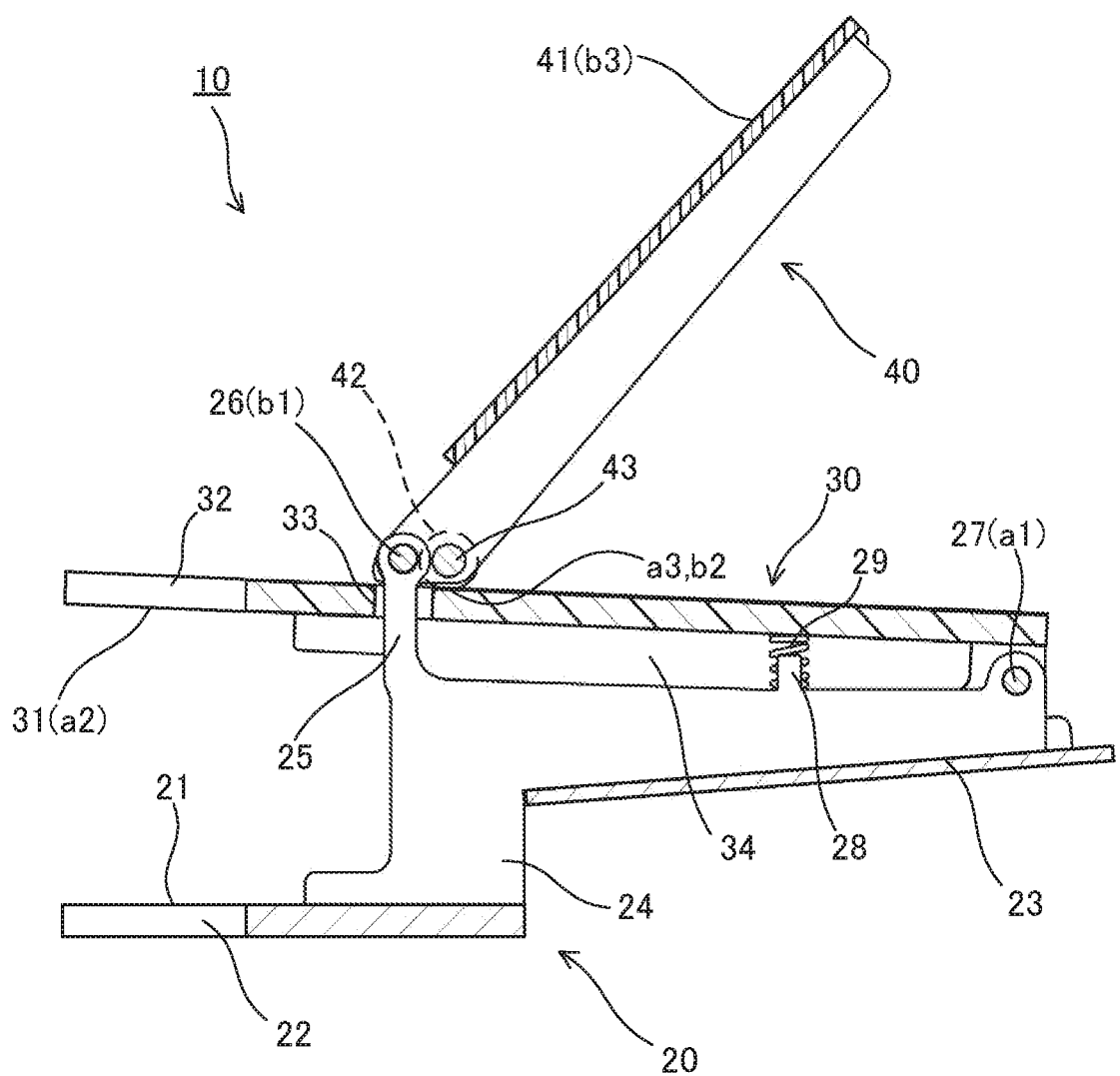
FIG. 5 is a cross sectional view of the clamping jig shown in FIG. 3 taken along the line A-A, as viewed in the direction indicated by the arrows.

The first member 20 includes, at its leading end, a first clamping portion 21 to which a tube 60 is fitted and that presses the collar portion 63 of the tube 60, and also includes, at its base end, a first gripping portion 23 for a user to hold. The first clamping portion 21 includes, on the leading end side, a substantially U-shaped first clamping groove 22 to which the tube 60 is fitted. In the embodiment shown in the diagrams, the first clamping portion 21 and the first gripping portion 23 are attached to a first plate 24 and connected to each other. As shown in FIG. 5, the leading end of the first plate 24 protrudes downward, and the first clamping portion 21 is attached to the protruding portion, and the first gripping portion 23 is attached to a recessed portion inclined upward at the base end. The height difference between the first clamping portion 21 and the first gripping portion 23 is preferably set to a height that enables placement of fingers of the user.

A pivot shaft 27 is attached to the first plate 24 on the base end side thereof, and thereby forms a pivoting portion on which the second member 30 pivots. Also, the first plate 24 includes, on the leading end side, a support rod 25 that protrudes upward. The leading end of the support rod 25 extends through the second member 30, and a support shaft 26 that serves as a support portion is attached to the leading end of the support rod 25. The support rod 25 is provided at a position on the leading end side of the first member 20, desirably at a position on the leading end side with respect to the center of the first member 20, and more desirably at a position about ⅓ the length of the first member 20 from the leading end of the first member 20.

The first plate 24 is also provided with a spring attachment portion 28 protruding upward at a position toward the base end thereof, and a biasing member 29 such as a coil spring is fitted to the spring attachment portion 28.

The second member 30 includes, on the leading end side, a second clamping portion 31 that includes a substantially U-shaped second clamping groove 32 to which a tube 60 is fitted, and its base end pivots about the pivot shaft 27 described above. The upper end of the biasing member 29 abuts against the underside of the second member 30, and the second clamping portion 31 is biased about the pivot shaft 27 in a direction away from the first clamping portion 21.

As shown in FIG. 5, an insertion hole 33 through which the support rod 25 of the first plate 24 passes with some room is formed in the second member 30. A guard plate 34 is attached, facing downward, to a side surface of the second member 30 so as to prevent entry of a foreign body.

The lever member 40 includes, at its base end, a lever gripping portion 41 for the user to hold, and the leading end is pivoted about the support shaft 26 provided in the leading end of the support rod 25 described above so as to be capable of swinging within an up-down plane.

The lever member 40 includes a pressing portion that abuts against the second member 30 and applies a pressing force to the second member 30 when the lever member 40 is brought from a state in which the base end of the lever member 40 is inclined relative to the first member 20 at an angle of about 60° to 80° as shown in FIG. 1 into a state in which the lever member 40 is substantially parallel to the first member 20 as shown in FIG. 2. In the diagrams, the pressing portion is a pressing roller indicated by reference numeral 42 that is provided at a position closer to the base end side than the support shaft 26 is, and rollably supports a roller shaft 43 attached to the lever member 40.

With the clamping jig 10 configured as described above, when the user holds the first gripping portion 23 and the lever gripping portion 41, the pressing roller 42 of the lever member 40 presses the second member 30 against the biasing force of the biasing member 29, and brings the first clamping portion 21 and the second clamping portion 31 closer to each other.

As shown in FIG. 5, in the second member 30, with respect to the first member 20, the pivot shaft 27 functions as a fulcrum point a1, the second clamping portion 31 functions as a load point a2 (when pressing the collar portion 63 of the tube 60), and the upper surface of the second member 30 that takes on the pressing force from the pressing roller 42 functions as an effort point a3

With this configuration, the first member 20 and the second member 30 can have a long distance between the fulcrum point a1 and the load point a2 that corresponds to substantially the overall length of the clamping jig 10. Accordingly, it is possible to suppress relative variation of the angle between the first clamping portion 21 and the second clamping portion 31, and the first clamping portion 21 and the second clamping portion 31 can be brought closer to each other or apart from each other while maintaining a state in which the first clamping portion 21 and the second clamping portion 31 are substantially parallel to each other. It is therefore possible to, when the collar portions 63 and 63 are clamped by the clamping portions 21 and 31, suppress a reduction in sealability caused by the collar portions 63 being inclined.

The pressing roller 42 that serves as the effort point a3 on the second member 30 applies a pressing force between the pivot shaft 27 that serves as the fulcrum point a1 and the second clamping portion 31 that serves as the load point a2, and thus the overall length of the clamping jig 10 can be shortened, and the clamping jig 10 can be made compact. Furthermore, the effort point a3 is provided at a position closer to the load point a2 than the fulcrum point a1. With this configuration, the distance between the fulcrum point a1 and the effort point a3 can be increased, and the second member 30 can be pressed with a small force.

Also, in the lever member 40, the support shaft 26 functions as a fulcrum point b1, the pressing roller 42 functions as a load point b2 (also functions as the effort point a3), and the lever gripping portion 41 functions as an effort point b3. In the lever member 40, the distance between the fulcrum point b1 and the load point b2 is shorter than the distance between the fulcrum point b1 and the effort point b3, and it is therefore possible to amplify the force applied to the lever gripping portion 41 at the load point b2, and press the second member 30 with a large force.

A method of using the clamping jig 10 configured as described above will be described. As shown in FIG. 1, a sealing member 64 is first attached to the flange 62 of one tube 60, and then the flange 62 of another tube 60 is pressed against the sealing member 64. FIG. 1 shows a state in which the upper tube 60 is not completely attached to the sealing member 64.

In this state, the first clamping groove 22 and the second clamping groove 32 are respectively fitted to the rear of the collar portions 63 and 63 of the tubes 60 and 60 while the lever member 40 is open as shown in FIG. 1. Because the first member 20 and the second member 30 have a long distance between the fulcrum point a1 and the load point a2 that corresponds to substantially the overall length of the clamping jig 10, relative variation of the angle between the first clamping portion 21 and the second clamping portion 31 is small, and the first clamping portion 21 and the second clamping portion 31 are kept substantially parallel to each other. It is therefore possible to keep the collar portions 63 from being inclined when the collar portions 63 and 63 are clamped by the clamping portions 21 and 31.

Then, when the user holds the first gripping portion 23 and the lever member 40, the lever member 40 functions as a lever, and is brought closer to the first member 20 by the pressing force on the effort point b3 while pivoting about the support shaft 26 that serves as the fulcrum point b1. As a result, the pressing roller 42 of the lever member 40 functions as the load point b2 (the effort point a3) on the second member 30, and presses the second member 30 from above. Because the pressing roller 42 is rollably supported, the pressing roller 42 can smoothly apply a pressing force to the second member 30 by rolling.

Because the first gripping portion 23 is provided at a position recessed from the first clamping portion 21, even in the case where the distance to another tube, a device, a wall surface, or the like is short, the user can easily place his/her fingers on the first gripping portion 23, and thus the workability can be improved.

The second member 30 takes on the pressing force from the lever member 40, and swings closer to the first member 20 about the pivot shaft 27 that serves as the fulcrum point a1. The second clamping portion 31 functions as the load point a2 on the collar portion 63 of the tube 60, and is brought closer to the first clamping portion 21 while the second clamping portion 31 is kept substantially parallel to the first clamping portion 21. As a result, as shown in FIG. 2, the first clamping portion 21 and the second clamping portion 31 provide a clamping force in a direction in which the collar portions 63 and 63 of the tubes 60 and 60 are brought closer to each other, and the collar portions 63 and 63 are pressed. Then, the flanges 62 and 62 take on the pressing force, and are firmly attached to the sealing member 64, as a result of which the tubes 60 and 60 are connected to each other. With the clamping jig 10 according to the present invention, the clamping portions 21 and 31 press the collar portions 63 and 63 while the clamping portions 21 and 31 are kept substantially parallel to each other. Accordingly, the flanges 62 can be firmly attached to the sealing member 64 without being inclined, and thus the sealability can be enhanced. The state in which the flanges 62 are firmly attached to the sealing member 64 can be maintained by attaching a clip to sandwich the flanges 62 and 62 while the flanges 62 are firmly attached to the sealing member 64.

After the tubes 60 and 60 have been connected, when the user releases the grip, the second member 30 and the lever member 40 are pushed back against the first member 20 by the biasing force of the biasing member 29. In this state, the clamping jig 10 can be removed by pulling the first member 20 and the second member 30 away from the tubes 60 and 60.

The clamping jig 10 of the present invention configured as described above can bring the collar portions 63 and 63 closer to each other using a large clamping force while the clamping jig 10 is made compact, and the tubes 60 and 60 can be connected in a leak-proof manner.

Also, because the clamping jig 10 can be made compact, it is also possible provide the advantage of the user being able to conduct work even in a small and narrow space.

The foregoing description is given merely to describe the present invention. Accordingly, it should not be construed as limiting the invention recited in the appended claims or narrowing the scope of the present invention. Also, the constituent elements of the present invention are not limited to those described in the example above, and it is of course possible to make various modifications within the technical scope defined in the appended claims.

For example, the shape, length, and the like of each member shown in the diagrams are merely an example. Thus, it is to be understood that various modifications are possible. Also, the configuration of the tubes 60 is not limited to the configuration shown in the example as long as the tubes 60 are configured to include a collar portion 63 or configured in a similar manner.

DESCRIPTION OF REFERENCE CHARACTERS

10 clamping jig for tube connection
20 first member
21 first clamping portion
23 first gripping portion
26 support portion
27 pivoting portion
30 second member
31 second clamping portion
40 lever member
41 lever gripping portion
42 pressing portion
60 tube
61 joint
63 collar portion

What is claimed is:

1. A clamping jig for tube connection that clamps joint-equipped tubes, each tube including a protruding collar portion at a position rearward of a leading end thereof, the clamping jig for tube connection comprising:
   a first member that includes a first clamping portion that is provided at a leading end thereof and to which one of the tubes is fitted, and a first gripping portion formed at a base end thereof;
   a second member that includes a second clamping portion that is provided at a leading end thereof and to which the other tube is fitted, and a base end thereof being pivotally supported at the base end of the first member by a pivoting portion;
   a support connector that extends from the first member through the second member; and
   a lever member in which a leading end thereof is pivotally supported by a support portion provided in the support connector, and a lever gripping portion is formed at a base end thereof, the lever member enabling swinging of the lever gripping portion in a direction of the base end of the second member, and the lever member including a pressing portion that presses the second member on the base end side relative to the support portion.

2. The clamping jig for tube connection according to claim 1,
   wherein, in the first member, the first gripping portion is provided at a position recessed from the first clamping portion.

3. The clamping jig for tube connection according to claim 1, comprising:
   a biasing member that is provided between the first member and the second member and biases the second member in a direction away from the first member.

4. The clamping jig for tube connection according to claim 1,
   wherein the pressing portion is a pressing roller that is pivotally supported by the lever member.

5. The clamping jig for tube connection according to claim 1,
   wherein the pressing portion presses the second member between the portion and the pivoting portion.

6. The clamping jig for tube connection according to claim 1,
   wherein the first clamping portion and the second clamping portion are U-shaped clamping grooves.

* * * * *